May 5, 1959             R. R. FIKE             2,885,532
METHOD OF MAKING PUMP BUSHINGS AND THE LIKE
Filed April 25, 1956
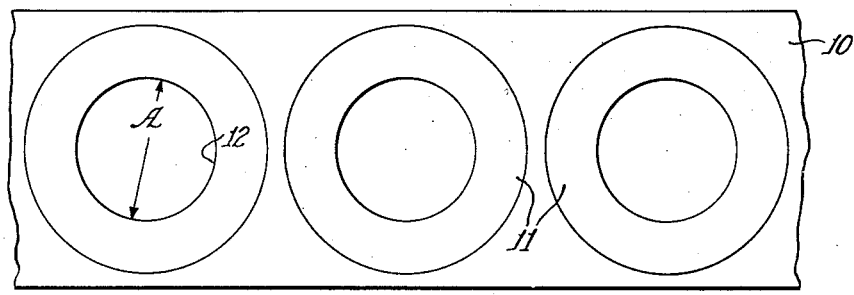
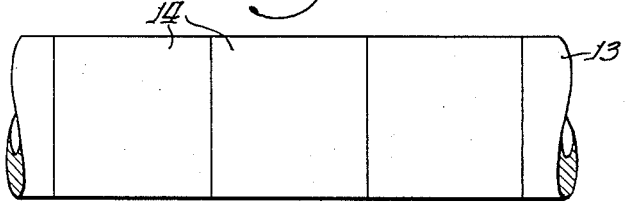
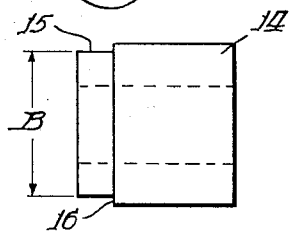 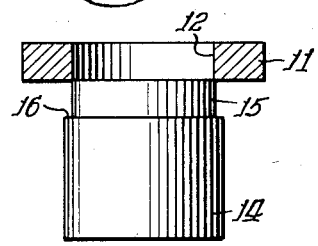
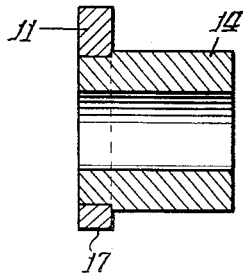 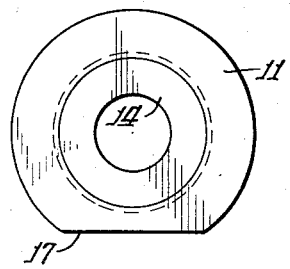
Inventor:
Russell R. Fike
By: Joseph R. Dwyer, Atty.

United States Patent Office 2,885,532
Patented May 5, 1959

2,885,532
METHOD OF MAKING PUMP BUSHINGS AND THE LIKE

Russell R. Fike, Euclid, Ohio, assignor to Borg-Warner Corporation, Chicago, Ill., a corporation of Illinois Application April 25, 1956, Serial No. 580,578

1 Claim. (Cl. 219—107)

This invention relates to pump bushings, end plates, or the like, and more particularly to a method of making such pump bushings, end plates or the like.

The usual intermeshing gear pumps are of two varieties, namely, fixed displacement and pressure loaded. In the former type of pump, the housing walls adjacent the gear side faces usually form bushings for the gears, while in the latter, there are provided pairs of pump bushings fitting into complementary shaped portions of the housing, the bushings being on the opposite side of the gears. One pair of the bushings is generally axially movable and pressure loadable, so as to make sealing contact with the adjacent gear side faces. Each of the bushings, whether pressure loaded or not, is substantially alike in construction and usually comprises a flanged portion and a barrel portion, the flanged portion being in engagement with the adjacent gear side face and the barrel portion forming a journal for the axially extending gear shafts. The usual bushing for such a pump is machined from a block of metal, and after machining to approximately its final dimensions, may be provided with various bearing surfaces, such as bronze, babbitt, or the like, a very expensive and time consuming process. By this invention, the bushings, end plates or the like may be produced cheaply and rapidly, thus resulting in a saving of time and money. Therefore, the principal object of this invention is the provision of an improved method of making pump bushings, end plates, or the like.

More specifically, this invention contemplates the use of readily available stock shapes of metal, such as, sheet material and tubular stock, which may be either an alloy or a composite bonded structure, such as the combination of steel and bronze, aluminum and bronze, or the like. The flanged portion, before referred to, is merely stamped from sheet stock by a usual punching operation, as with a punch press, and the tubular or barrel portion, before referred to, is cut from tubular stock with a minimum amount of machining. The component parts are then assembled, in a manner which will be fully described, and welded into a unitary structure, after which a finish machining is normally required. Therefore, a still further object of this invention is the provision of an improved method of making pump bushings, end plates or the like from readily available sheet material and tubular stock, in which the machining of the assembled article is reduced to a minimum.

Another object of this invention is the provision of an improved method of making pump bushings, end plates or the like, in which component parts thereof are stamped and cut from readily available stock material.

Another and still further object of this invention is the provisions of stamping a flanged portion of an article from sheet material, cutting a tubular portion of an article from tubular stock, assembling the component parts of the structure, and joining the parts together by welding.

These and other objects and features of this invention will become apparent from the following description when taken with the accompanying drawing, in which:

Figure 1 is an illustration of sheet stock having the flanged portion of the assembly punched therefrom before the stamped parts are removed from the sheet stock;

Figure 2 is an illustration of tubular stock illustrating how the tubular or barrel portions of the assembly are cut from the stock;

Figure 3 is an illustration of a tubular portion of the assembly;

Figure 4 is an illustration of the manner in which the component parts are assembled for joining them together;

Figure 5 is a cross-sectional view of the completed article; and

Figure 6 is a view of the face of the completed article.

Referring now to the drawing, and in particular to Figure 1, there is shown a strip of sheet metal 10 having a series of annuli 11 stamped therefrom, which form the flanged portions of the articles to be produced. The outer circumference of the annuli 11 closely approach the dimension of the finished article, while the central opening 12 is made with a predetermined diameter A, to be later described.

Referring now to Figure 2, it is obvious that the tubular material 13 is merely cut to form a series of short blanks 14 of a predetermined length, which length corresponds approximately to the length of the finished bushing. Each of the blanks 14 is machined to form a reduced cylindrical portion 15 terminating in a shoulder 16 (see Figure 3); the reduced portion 15 having a diameter generally indicated at B.

The two parts, namely an annulus 11 and a tubular part 14 are assembled as illustrated in Figure 4, and it must be noted that there is interference between the central opening 12 in the annulus 11 and the reduced portion 15 of the tubular part 14, or, expressed in another way, the dimension B is slightly larger than the dimension A. Therefore, when the parts are assembled preparatory to joining them together, the annulus 11 merely rests on the terminal end of the reduced portion 15 of the tubular part 14.

The assembled parts are joined together by resistance welding. A resistance welding current is applied to the outer surface of the reduced portion 15 of the tubular part 14 and the surface of the central opening 12 of the annulus whereby the interference surfaces become molten. Simultaneously, an axial pressure is applied against the annulus 11, whereby the molten surfaces permit the annulus 11 to be assembled on the reduced portion 15 of the tubular part 14 and against the shoulder 16. After the annulus 11 has been assembled against the shoulder 16 of the tubular part 14, the resistance welding current is then terminated and the molten surfaces are allowed to solidify and form a resistance weld therebetween. Thus a rough shaped bushing is formed.

The only step necessary after the parts are assembled, is a finished machining, which includes a cutting off of a portion of the annulus 11 so as to form a flat chordal surface 17 (see Figure 6). When the pumps are assembled with a pair of bushings on each side of the gears, the flat chordal surfaces of the pair will meet in the usual manner.

While I have described my invention in connection with one specific embodiment thereof, it is to be understood that this is by way of illustration and not by way of limitation and the scope of my invention is defined solely by the appended claim which should be construed as broadly as the prior art will permit.

I claim:

A method of making pump bushings, end plates, or the like, comprising, providing a flat metal annulus having its central opening of a predetermined diameter, providing a tubular metal part having a reduced portion thereon terminating in a shoulder normal to the axis of said part, said reduced portion having a diameter slightly greater than that of said predetermined diameter and a length substantially equal to the thickness of said annulus, assembling said annulus and said part in such a manner that the annulus rests on said reduced part with said opening in alignment therewith, applying a resistance welding current to the interference surfaces of said annulus and said reduced portion while simultaneously applying an axial pressure against said annulus whereby the metal on the interference surfaces of said annulus and said part becomes heated to a molten state thereby facilitating the assembling of said annulus on said reduced portion and against said shoulder of said part, and then terminating the resistance welding current and allowing the molten surfaces to solidify and form a resistance weld therebetween.

References Cited in the file of this patent
UNITED STATES PATENTS

| | | |
|---|---|---|
| 385,384 | Thomson | July 3, 1888 |
| 1,292,812 | Lachman | Jan. 28, 1919 |
| 1,302,699 | Noble et al. | May 6, 1919 |
| 1,381,462 | Hench | June 14, 1921 |
| 1,618,541 | Long | Feb. 22, 1927 |
| 1,776,615 | Boothman et al. | Sept. 23, 1930 |
| 2,050,339 | Kidd | Aug. 11, 1936 |
| 2,082,379 | Brittain | June 1, 1937 |
| 2,265,725 | Frederick | Dec. 9, 1941 |
| 2,798,141 | Longacre | July 2, 1957 |